March 11, 1969     H. L. BOWDITCH     3,431,935
APPARATUS FOR USE IN THE MEASUREMENT OF FLUID FLOW
Filed Oct. 23, 1965

INVENTOR
*Hoel L. Bowditch*
BY
*Curtis Morris + Safford*
ATTORNEYS

Fig 10

# United States Patent Office 3,431,935
Patented Mar. 11, 1969

3,431,935
APPARATUS FOR USE IN THE MEASUREMENT OF FLUID FLOW
Hoel L. Bowditch, Foxboro, Mass., assignor to
The Foxboro Company, Foxboro, Mass.
Filed Oct. 23, 1965, Ser. No. 503,250
U.S. Cl. 137—269                       18 Claims
Int. Cl. F16l *23/00;* G01l *13/02*

ABSTRACT OF THE DISCLOSURE

A manifold and valve system for coupling a differential pressure measuring device to a pair of fluid pressure conduits. The system provides a predetermined sequence of valve actuations which assures that the differential pressure device is not subjected during the coupling (or uncoupling) operation to a pressure difference greater than the differential pressure to be measured, regardless of the static pressure of the line under measurement. The manifold also is provided with a coupling arrangement permitting mounting of the measuring device directly on a fluid flow pipe, in any of several selectable orientations, depending upon the particular application.

---

The present invention relates, in general, to the measurement of differential pressures and more particularly to a manifold for connecting a differential pressure measuring device to a fluid line in which differential pressures are to be measured.

One of the prime uses of a differential pressure measuring device is in the measurement of fluid flow. In such an application, the pressure measuring device is made responsive to the differential pressure across an orifice that is inserted in the line through which the fluid to be metered flows. The measured differential pressure provides an indication of the volume of fluid flowing through the pipe and, therefore, a measure of the fluid flow through the line. One type of measuring device that has been used for this purpose comprises a resilient diaphragm mounted in a sealed casing with its opposite sides exposed to the pressures upstream and downstream of the orifice so that the diaphragm is deflected an amount representative of the magnitude of the differential pressure across the orifice. Movement of or force on the diaphragm is mechanically transmitted through the wall of the casing and translated, for example, into corresponding pneumatic pressure values that may be used to actuate a suitable indicating, recording or controlling instrument which may, in some cases be located a considerable distance from the measuring device. A differential pressure measuring device of this general type is disclosed in U.S. Patent 2,806,480 Bowditch.

It is important when connecting a differential pressure measuring device into a fluid line to prevent applying line pressure to only one side of the diaphragm. If only one side of the diaphragm is subjected to line pressure, the diaphragm is apt to rupture or be seriously damaged. In order to avoid damaging the diaphragm, presently available differential pressure measuring devices require the turning of a number of valves in the proper sequence to safely place the pressure measuring device on line. Experience has proven that the proper sequence is not always followed and that the diaphragms of the pressure measuring devices are damaged in many cases.

It is an object of the present invention to provide a new and improved manifold for connecting a differential pressure measuring device to a fluid line in which differential pressure are to be measured. It is another object of the present invention to provide such a manifold which employs a single handle for controlling all the necessary valve openings and closings in the proper sequence in order to properly place a differential pressure measuring device on a fluid line or remove such a pressure measuring device from a fluid line without damaging the diaphragm of the pressure measuring device. It is a further object of the present invention to provide a new and improved manifold of the character described which is relatively simple in construction and inexpensive to fabricate. Other objects, aspects and advantages of the invention will in part be pointed out in, and in part be apparent from, the following description of a preferred embodiment of the invention.

In this embodiment, a single control member places a differential pressure measuring device on line in three stages. In the first stage, communication is established between both sides of the diaphragm of the pressure measuring device and one side of an orifice inserted into the fluid line to be metered. Next, communication between one side of the diaphragm and the orifice is cut off. In the third stage the side of the diaphragm which has been cut off from the orifice is connected to the second side of the orifice. In taking the differential pressure measuring device off of the fluid line the sequence of stages is reversed.

A result of this operation is that fluid in the line being metered does not pass completely through the manifold. This is particularly advantageous in certain applications. For example, when a buffer fluid is employed in the manifold to conduct the pressures to the pressure measuring device, the escape of this buffer fluid into the metered fluid line may adversely affect the system to which the fluid line is connected.

Novel apparatus is also described for supporting the manifold and the pressure measuring device on the fluid line and for effecting a fluid connection between the line and the manifold. As will be brought out in more detail hereinafter, this supporting apparatus permits a wide variety of mounting arrangements to satisfy the many different requirements of various field installations.

For a better understanding of the present invention, together with other and further objects thereof, reference is made to the following description, taken in connection with the accompanying drawings, and its scope will be pointed out in the appended claims.

Referring to the drawings.

Figure 1:
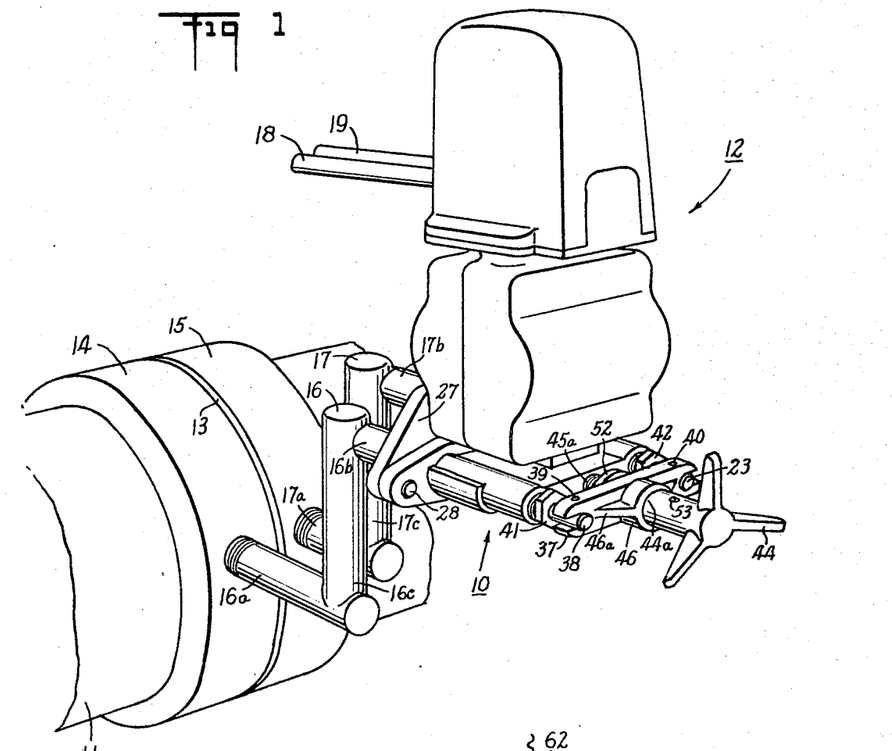
FIGURE 1 is a perspective view of a manifold constructed in accordance with the present invention interposed between a fluid line and a differential pressure measuring device.
Figure 2:
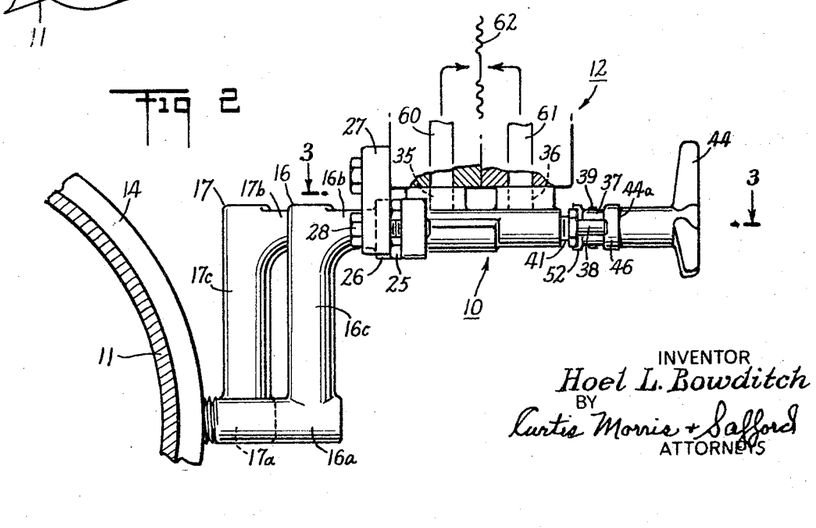
FIGURE 2 is a side view of the manifold shown in FIGURE 1 along with its mounting apparatus.

Referring to FIGURES 1 and 2, a manifold 10 constructed in accordance with the present invention and described in more detail hereinafter serves to connect a pressure measuring device 12 to a fluid line 11 in which differential pressures are to be measured. The fluid line 11 is provided with an orifice plate 13 mounted between a pair of flanges 14 and 15 in the usual manner to provide a pressure drop across the orifice that is a function of the fluid flow through the line. The pressures upstream and downstream of the orfice are conducted to the manifold 10 through movable legs 16 and 17, respectively, having threaded ends received by threaded bores in the flanges 14 and 15, respectively. The movable legs 16 and 17, in the form of tubular members, also provide support in mounting the manifold 10 and the differential pressure measuring device 12 on the fluid line 11 and will be described in more detail hereinafter.

Figures 3, 3A, 3B:
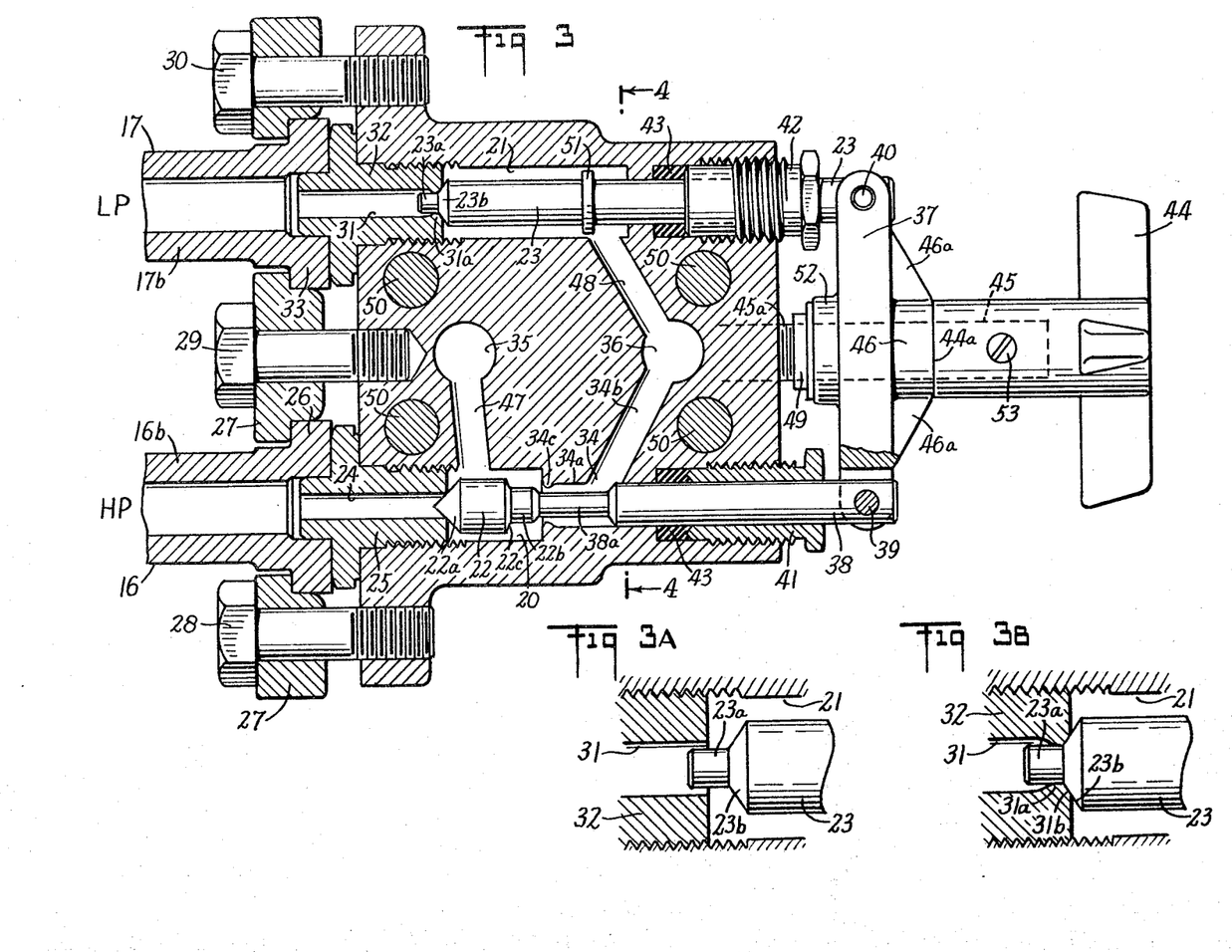
FIGURE 3 is a horizontal section taken along line 3—3 of FIGURE 2.
FIGURES 3a and 3b are enlarged showings of how a valve seat in the manifold is formed.

The differential pressure measuring device 12 is mounted on the manifold 10 in any suitable manner such as by means of four bolts 50 shown in cross-section in FIGURE 3. This pressure measuring device may be of conventional construction and operation similar to the device described in the aforementioned Bowditch patent. Compressed air to operate the transmitter portion of the differential pressure measuring device is supplied from a suitable source through a pipe 18. The output pressure of the transmitter, which is a function of the flow through line 11, may be conducted from the transmitter through a pipe 19 to a suitable indicating, recording or controlling device, not shown, located at a point distant from the transmitter. The pressures upstream and downstream of the orifice are conducted to both sides of a diaphragm 62, shown diagramatically in FIGURE 2, by means of passages 60 and 61.

Referring to FIGURES 1 through 4, inclusive, the manifold 10 includes first and second chambers 20 and 21. Chambers 20 and 21 are arranged so that their longitudinal axes are parallel to each other. Chamber 20 has at one end wall thereof a valve seat which receives a valve head 22a of a closure member 22 movable longitudinally in chamber 20. A second valve head at the opposite end of closure member 22 is received by a valve seat at the opposite end wall of the chamber 20. This valve head is composed of two parts. Part 22b serves as a slide valve while part 22c serves as a gate valve. The chamber 21 has at one end thereof a valve seat for receiving the two-part valve head 23a, 23b of a second closure member 23 movable longitudinally in chamber 21.

A first inlet 24 is provided for connecting chamber 20 to the high pressure side of the orifice in plate 13 inserted into the fluid line 11. Inlet 24 is a central passage in a threaded plug 25 which is inserted into the casing of the manifold. The movable leg 16 is coupled to the plug 25 by means of the flanged end 26 of leg 16 being fitted over the exterior end of the plug 25. The flanged end 26 is held against the plug 25 by means of a plate 27 bolted to the casing of the manifold by three bolts 28, 29 and 20.

A second inlet 31 connects chamber 21 to the low pressure side of the orifice in plate 13. Inlet 31 is also in the form of a central passage in a threaded plug 32. The movable leg 17 is coupled to the plug 32 by means of the flanged end 33 of the leg 17 being fitted over the exterior end of the plug 32 and being held against plug 32 by the plate 27.

FIGURE 3b shows on an enlarged scale the details of inlet 31 and the two-part valve head of closure member 23. Part 23a serves as a slide valve, while part 23b serves as a gate valve. The slide valve has a built-in "deadspace" in that the valve may move over a predetermined distance before the inlet is opened and after the inlet is closed. In order to function properly, the passage through which the slide valve moves and the slide valve itself should be fabricated for a tight fit thereby rendering the unit fluid tight. As shown in FIGURES 3 and 3b, the inlet 31 has a bulge 31a at the chamber end of the inlet. This bulge is formed by forcing part 23b of the valve head against the opening of the inlet. FIGURE 3a shows the inlet prior to the bulge being formed. The material used for plug 32 is intentionally selected to deform on application of sufficient force to the opening of the inlet 31. This force is substantially greater than the force employed during normal closings of the inlet. As the bulge 31a is formed, a chamferred surface 31b is formed to receive part 23b of the valve head. The inlet is deformed until the bulge 31a and the part 23a form a fluid tight fit.

The differential pressure measuring device 12 is in fluid communication with the manifold 10 by means of a pair of outlets 35 and 36. Outlet 35 communicates with chamber 20 by means of a passage 47 opening into chamber 20 at a point in the side wall of the chamber intermediate the two end walls. The other end of outlet 35, not shown, is adapted to be coupled to the high pressure side of the differential pressure measuring device 12 by a suitable connection. Outlet 36 communicates with chamber 21 by means of a passage 48 opening into chamber 21 at a point in the side wall of the chamber near the end wall opposite from the inlet 31. The other end of outlet 36, not shown, is adapted to be coupled to the low pressure side of the differential pressure measuring device 12 also by a suitable connection.

A bypass 34 serves to connect chamber 20 and outlet 36. For the particular embodiment illustrated, the bypass includes two straight sections 34a and 34b. Section 34a communicates with chamber 20 at the end wall opposite from inlet 24 and is axially aligned with chamber 20. Section 34b communicates with outlet 36 and is disposed in a direction transverse to the chamber 20.

A bulge 34c, similar to bulge 31a in inlet 31, is formed in section 34a of the bypass by forcing gate valve 22c against the opening of the bypass with sufficient force. It is particularly important to form a fluid tight seal at this point so that when the differential pressure measuring device is placed on line no leakage occurs through the bypass which would result in erroneous measurements.

The closure members 22 and 23 are arranged to be movable back and forth longitudinally in the chambers 20 and 21. Valve head 22a serves to close inlet 24 when closure member 22 is positioned at the inlet end of chamber 20. Slide valve 22b serves to close the bypass when closure member 22 is positioned at the bypass end of chamber 20. Gate valve 22c provides added protection against leakage from the bypass by backing up the slide valve 22c when the bypass is closed off. The two-part valve head of closure member 23 serves to close inlet 31 when positioned at the inlet end of chamber 21.

The closure members 22 and 23 are coupled together by means of a yoke 37. Closure member 22 is connected to the yoke 37 through a connecting rod 38 having a section 38a of reduced diameter which extends axially through passage 34a. The connecting rod 38 is secured to the yoke 37 by means of a pin 39. Closure member 23 is connected to the yoke 37 by means of a pin 40. The connecting rod 38 and closure member 23 pass through central bores in a pair of threaded plugs 41 and 42, respectively, which are inserted into the casing of the manifold. Suitable packing material 43 is provided in the wells which receive plugs 41 and 42. This packing material effects a pneumatic seal at the points at which the connecting rod 38 and the closure member 23 enter the respective plugs 41 and 42.

Figure 4:
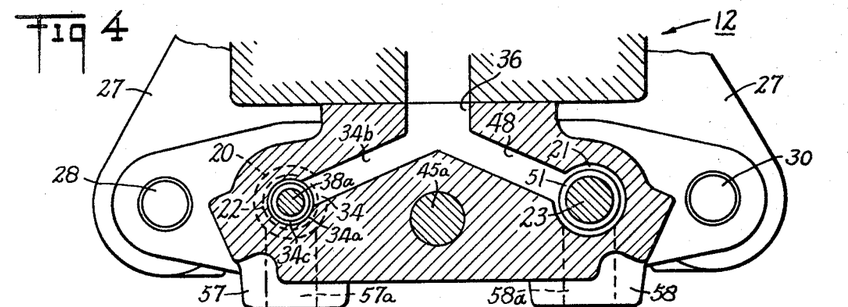
FIGURE 4 is a vertical section taken along line 4—4 of FIGURE 3.

The yoke 37 is moved back and forth in a direction parallel to the longitudinal axes of the chambers 20 and 21 by means of a handle 44 affixed to a shaft 45 by means of a set screw 53. The shaft 45 has a threaded end 45a which is received in a threaded well in the casing of the manifold. A sleeve 46 is affixed to one side of the yoke 37 by means of a pair of angles 46a. A shoulder member 52 having a bore aligned with the bore of sleeve 46 is affixed to the opposite side of the yoke 37. The shaft 45 extends through the sleeve 46, the yoke 37 and the shoulder member 52. A bearing member 49 is affixed to the shaft 45 and is adapted to bear against shoulder member 52.

As the handle 44 is turned clockwise as viewed in FIGURE 1, edge 44a of the handle bears against sleeve 46 and pushes yoke 37 toward the casing. The yoke 37, in turn, causes the connecting rod 38 and the closure member 23 to slide toward the left as viewed in FIGURE 3. The action causes the valve heads 22a and 23a, 23b to seat in their respective valve seats and close the respective inlets 24 and 31. As the handle 44 is turned counterclockwise, bearing member 49 bears against shoulder member 52 and pushes yoke 37 away from the casing. The yoke 37, in turn, causes the connecting rod 38 and the closure member 23 to slide toward the right. A stop member 51, in the form of a ring secured to the closure member 23, limits the movement of the closure member 23 to the right by abutting against the end wall of chamber 21. Since the movement of connecting rod 38 is confined to the bore in plug 41 and the movement of the shaft 45 is maintained axial with the threaded well in which end 45a is received, the movement to the right of the connecting rod 38 is also stopped when the ring 51 abuts against the end wall of chamber 21. Although the connecting rod 38 and the closure member 23 are secured to the yoke 37 by means of pins 39 and 40, respectively, and these pins permit relative rotary movement between the yoke, the closure member 23 and the connecting rod, by confining the lateral movement of the closure member 23, the connecting rod and the shaft 45, the yoke, the closure member 23, the shaft 45 and the connecting rod constitute a single unit which is moved by handle 44. The pins 39 and 40 permit slight lateral self adjustments of the closure member 23 and the connecting rod 38.

Figure 5:
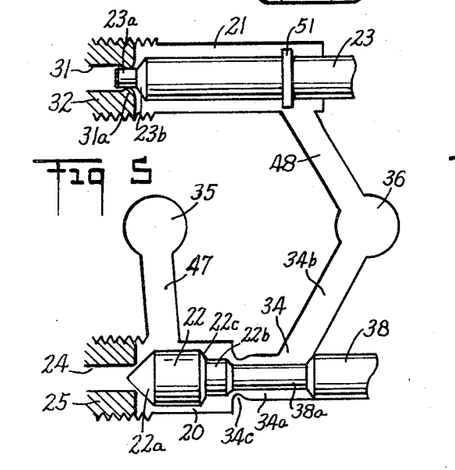
FIGURES 5, 6 and 7 illustrate, on an enlarged scale, the valving sequence of a manifold constructed in accordance with the present invention.
Figure 6:
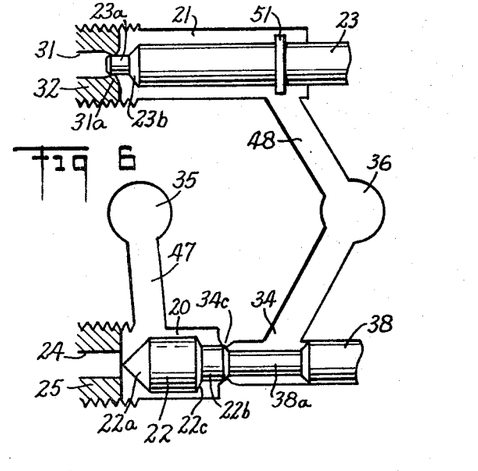
Figure 7:
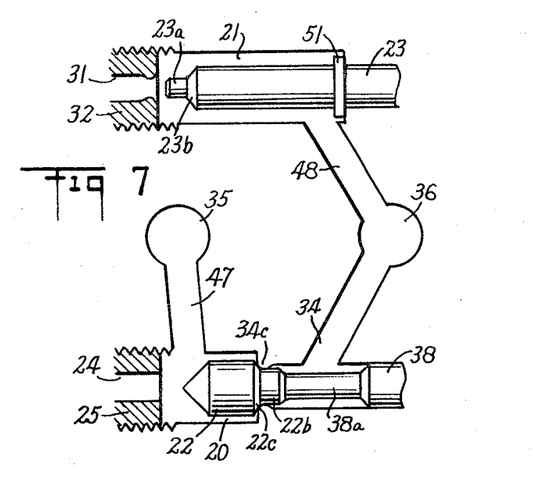

FIGURE 3 shows the closure member 22 and 23 seated in the respective inlets 24 and 31 so as to close off these inlets. At this time no fluid pressures are conducted to the differential pressure measuring device 12. FIGURES 5, 6 and 7, illustrate the valving sequence of manifold 10 in placing the pressure measuring device 12 on the fluid line 11. Referreing to FIGURES 3, 5, 6 and 7, as the handle 44 is turned counterclockwise, the closure members 22 and 23 are drawn to the right and the inlet 24 is opened first, while the inlet 31 remains closed. This condition is shown in FIGURE 5. The pressure upstream of the orifice is conducted to both the high and the low pressure sides of the differential pressure measuring device 12. The passage to the high pressure side of the pressure measuring device includes the inlet 24, chamber 20, passage 47 and outlet 35, while the passage to the low pressure side of the pressure measuring device includes the inlet 24, chamber 20, bypass sections 34a and 34b and outlet 36.

As the handle 44 is turned further counterclockwise, slide valve 22b seats in the bypass section 34a closing the bypass. This occurs prior to the slide valve 23a being completely unseated and is shown in FIGURE 6. Further counterclockwise turning of handle 44 completely unseats the slide valve 23a and opens inlet 31. At this point the differential pressure measuring device is connected to the fluid line and the pressure upstream of the orifice is conducted to the high pressure side of the pressure measuring device, while the pressure downstream of the orifice is conducted to the low pressure side of the pressure measuring device. This condition is shown in FIGURE 7.

To remove the differential pressure measuring device from the fluid line, the handle 44 is turned clockwise and the valving sequence is reversed. The inlet 31 is closed by the slide valve 23a prior to slide valve 22b being completely unseated and the bypass being opened.

In placing the pressure measuring device on line or removing it from the line, at no time is line pressure applied to only one side of the diaphragm in the pressure measuring device. When the pressure measuring device is on line, the differential pressure across the orifice exists across the diaphragm. When the pressure measuring device is being placed on line or being taken off the line both sides of the diaphragm are subjected to the pressure upstream of the orifice.

The connections shown in the drawings between the legs 16 and 17 and the inlets 24 and 31, respectively, may be reversed along with a reversal in the connections between the outlets 35 and 36 and the high and low pressure sides, respectively, of the differential pressure measuring device 12. For such an arrangement, both sides of the diaphragm in the pressure measuring device 12 are subjected to the pressure downstream of the orifice instead of the upstream pressure when the pressure measuring device is being placed on line or being taken off the line.

The legs 16 and 17 permit rapid and simple changes in the connections between the legs and the inlets 24 and 31. In addition, the legs 16 and 17 permit a wide variety of different mounting arrangements of the manifold 10 on the fluid line 11 to suit the many different situations which are apt to arise at field installations. Each of the legs 16 and 17 includes two parallel sections connected together by a transverse section. In particular, leg 16 comprises parallel sections 16a and 16b connected together by transverse section 16c. Leg 17 comprises parallel sections 17a and 17b connected together by transverse section 17c. The transverse sections are disposed at right angles to the parallel sections which they interconnect. When coupled to the fluid line 11, the parallel sections 16a and 16b of leg 16 are parallel to the parallel sections 17a and 17b of leg 17. Sections 16a, 16b, 17a and 17b are so dimensioned that the transverse sections 16c and 17c lie in two different planes which are perpendicular to the parallel sections 16a, 16b, 17a and 17b. This is best illustrated in FIGURE 2. In particular, section 16a is longer than section 16b, while section 17b is longer than section 17a. The transverse sections 16c and 17c are offset since section 16a is longer than section 17a, while section 17b is longer than section 16b. When the legs 16 and 17 are rotated in their couplings in the flanges 14 and 15, the transverse sections 16c and 17c do not interfere with one another. Such an arrangement permits mounting the manifold 10 on the fluid line 11 in a number of different ways.

Figure 8:
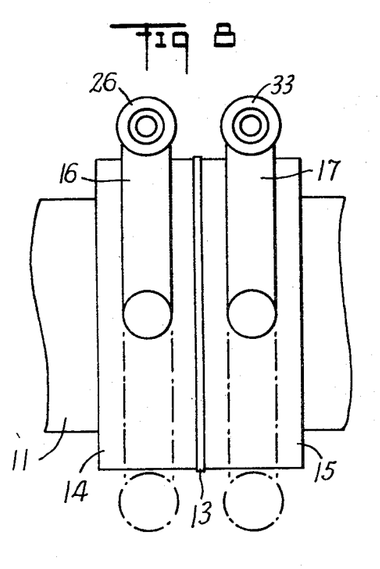
FIGURES 8, 9 and 10 illustrates how the supporting legs of the manifold permit different mounting arrangements of the manifold on a fluid line.

In FIGURE 8, the legs 16 and 17 are shown occupying the positions illustrated in FIGURES 1 and 2. By swinging the legs 16 and 17 180° to the positions shown dotted in FIGURE 8, the manifold 10 and the differential pressure measuring device 12 may be mounted in a manner similar to that shown in FIGURES 1 and 2 except that both units are displaced downward by a distance equal to twice the length of the transverse sections 16c and 17c of the legs. The legs 16 and 17 are swung into these different positions by turning sections 16a and 17a, respectively, into or out of the respective threaded bores in flanges 14 and 15.

Figure 9:
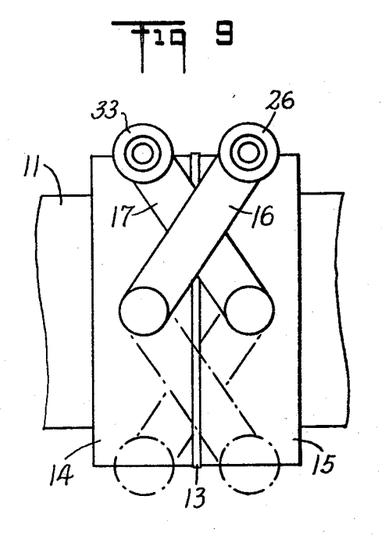

In FIGURE 9, the legs 16 and 17 are shown crossed thereby permitting a reversal, such as the one mentioned above, in the connections between the legs and the inlets to the manifold. The dotted lines in FIGURE 9 indicate another possible crossed arrangement of the legs 16 and 17.

Figure 10:
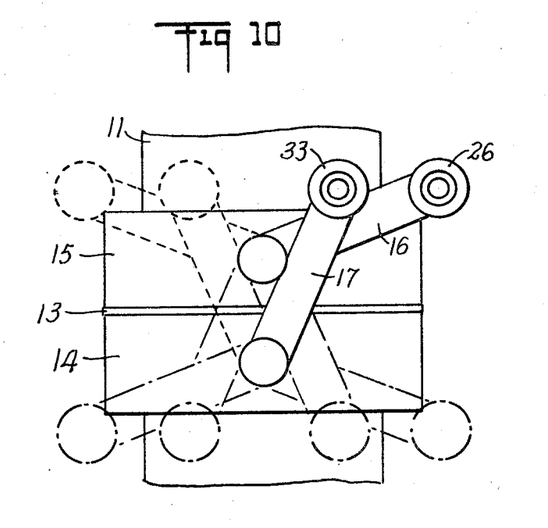

In FIGURE 10, the fluid line 11 is shown disposed vertically. For proper operation, the differential pressure measuring device 12 should be disposed vertically as shown in FIGURE 1. By arranging the legs 16 and 17 as shown in FIGURE 10 the pressure measuring device may be oriented properly when fitted onto a vertically extending fluid line. Three other arrangements of the legs 16 and 17 are shown dotted in FIGURE 10.

From the foregoing description of the legs 16 and 17 and the manner in which various connections may be effected, it will be apparent that there is a minimum length required for the transverse sections 16c and 17c to make possible the various arrangements. This minimum length is dependent upon the distance between the threaded bores in flanges 14 and 15 and the distance between the inlets 24 and 31.

Referring to FIGURE 4, a pair of downwardly extending legs 57 and 58 having bores 57a and 58a, respectively, are provided for draining the differential pressure measuring device and the manifold. The bores 57a and 58a communicate with chambers 20 and 21, respectively. When the manifold and the pressure measuring device are in normal use, the bores 57a and 58a are plugged by suitable means.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

What is claimed is:

1. A manifold for connecting a differential pressure measuring device to a fluid line into which an orifice is inserted for the measurement of differential pressures comprising:
   first and second chambers;
   a first inlet communicating with said first chamber and adapted to be coupled to a first side of said orifice;
   a second inlet communicating with said second chamber and adapted to be coupled to a second side of said orifice;
   a first outlet communicating with said first chamber and adapted to be coupled to a first input of said differential pressure measuring device;
   a second outlet communicating with said second chamber and adapted to be coupled to a second input of said differential pressure measuring device;
   a bypass having one end thereof communicating with said first chamber and a second end thereof communicating with said second outlet;
   a first closure member movable in said first chamber from said first inlet to said bypass for closing said first inlet when positioned at said first inlet and for closing said bypass when positioned at said bypass;
   a second closure member movable in said second chamber away from and toward said second inlet for closing said second inlet when positioned at said second inlet;
   and means for coupling said closure members together and for moving said closure members in said chambers to initially close said inlets and to subsequently open said first inlet and close said bypass prior to opening said second inlet.

2. A manifold for connecting a differential pressure measuring device to a fluid line into which an orifice is inserted for the measurement of differential pressures comprising:
   first and second chambers;
   a first inlet communicating with said first chamber and adapted to be coupled to a first side of said orifice;
   a second inlet communicating with said second chamber and adapted to be coupled to a second side of said orifice;
   a first outlet communicating with said first chamber and adapted to be coupled to a first input of said differential pressure measuring device;
   a second outlet communicating with said second chamber and adapted to be coupled to a second input of said differential pressure measuring device;
   a bypass having one end thereof communicating with said first chamber and a second end thereof communicating with said second outlet;
   a first closure member movable in said first chamber from said first inlet to said bypass for closing said first inlet when positioned at said first inlet and for closing said bypass when positioned at said bypass;
   a second closure member movable in said second chamber away from and toward said second inlet for closing said second inlet when positioned at said second inlet;
   and means for coupling said closure members together and for moving said closure members in said first and second chambers, said closure members so shaped and positioned relative to each other that initially said first closure member closes said first inlet and said second closure member closes said second inlet and upon movement away from said first and second inlets said first closure member closes said bypass prior to said second inlet being opened.

3. A manifold for connecting a differential pressure measuring device to a fluid line into which an orifice is inserted for the measurement of differential pressures comprising:
   first and second chambers;
   a first inlet communicating with said first chamber and adapted to be coupled to the high pressure side of said orifice;
   a second inlet communicating with said second chamber and adapted to be coupled to the low pressure side of said orifice;
   a first outlet communicating with said first chamber and adapted to be coupled to the high pressure side of said differential pressure measuring device;
   a second outlet communicating with said second chamber and adapted to be coupled to the low pressure side of said differential pressure measuring device;
   a bypass having one end thereof communicating with said first chamber and the second end thereof communicating with said second outlet;
   a first closure member movable in said first chamber from said first inlet to said bypass for closing said first inlet when positioned at said first inlet and for closing said bypass when positioned at said bypass;
   a second closure member movable in said second chamber away from and toward said second inlet for closing said second inlet when positioned at said second inlet;
   and means for coupling said closure members together and for moving said closure members in said first and second chambers, said closure members so shaped and positioned relative to each other that initially said first closure member closes said first inlet and said second closure member closes said second inlet and upon movement away from said first and second inlets said first closure member closes said bypass prior to said second inlet being opened.

4. A manifold for connecting a differential pressure measuring device to a fluid line into which an orifice is inserted for the measurement of differential pressures comprising:
   a first chamber;
   a second chamber disposed parallel to said first chamber;
   a first inlet communicating with said first chamber at one end of said first chamber and adapted to be coupled to a first side of said orifice;
   a second inlet communicating with said second chamber at one end of said second chamber and adapted to be coupled to a second side of said orifice;
   a first outlet communicating with said first chamber and adapted to be coupled to a first input of said differential pressure measuring device;
   a second outlet communicating with said second chamber and adapted to be coupled to a second input of said differential pressure measuring device;
   a bypass having one end thereof communicating with said first chamber at the second end of said first chamber and the second end of said bypass communicating with said second outlet;
   a first closure member movable longitudinally in said first chamber from said first inlet to said bypass for closing said first inlet when positioned at said first inlet and for closing said bypass when positioned at said bypass;

a second closure member movable longitudinally in said second chamber away from any toward said second inlet for closing said second inlet when positioned at said second inlet;

and means for coupling said closure members together and for moving said closure members in said chambers to initially close said inlets and to subsequently open said first inlet and close said bypass prior to opening said second inlet.

5. A manifold for connecting a differential pressure measuring device to a fluid line into which an orifice is inserted for the measurement of differential pressures comprising:

a first chamber;

a second chamber disposed parallel to said first chamber;

a first inlet communicating with said first chamber at one end of said first chamber and adapted to be coupled to the high pressure side of said orifice;

a second inlet communicating with said second chamber at one end of said second chamber and adapted to be coupled to the low pressure side of said orifice;

a first outlet communicating with said first chamber and adapted to be coupled to the high pressure side of said differential pressure measuring device;

a second outlet communicating with said second chamber and adapted to be coupled to the low pressure side of said differential pressure measuring device;

a bypass having one end thereof communicating with said first chamber at the second end of said first chamber and the second end of said bypass communicating with said second outlet;

a first closure member movable longitudinally in said first chamber from said first inlet to said bypass for closing said first inlet when positioned at said first inlet and for closing said bypass when positioned at said bypass;

a second closure member movable longitudinally in said second chamber away from and toward said second inlet for closing said second inlet when positioned at said second inlet;

and means for coupling said closure members together and for moving said closure members in said first and second chambers, said closure members so shaped and positioned relative to each other that initially said first closure member closes said first inlet and said second closure member closes said second inlet and upon movement away from said first and second inlets said first closure member closes said bypass prior to said second inlet being opened.

6. A manifold for connecting a differential pressure measuring device to a fluid line into which an orifice is inserted for the measurement of differential pressures comprising:

a first chamber;

a second chamber disposed parallel to said first chamber;

a first inlet communicating with said first chamber at one end of said first chamber and adapted to be coupled to the high pressure side of said orifice;

a second inlet communicating with said second chamber at one end of said second chamber and adapted to be coupled to the low pressure side of said orifice;

a first outlet communicating with said first chamber at at point intermediate the two ends of said first chamber, said first outlet adapted to be coupled to the high pressure side of said differential pressure measuring device;

a second outlet communicating with said second chamber at the second end of said second chamber, said second outlet adapted to be coupled to the low pressure side of said differential pressure measuring device;

a bypass having one end thereof communicating with said first chamber at the second end of first chamber and the second end of said bypass communicating with said second outlet;

a first closure member movable longitudinally in said first chamber from said first inlet to said bypass for cloing said first inlet when positioned at said first inlet and for closing said bypass when positioned at said bypass;

a second closure member movable longitudinally in said second chamber away from and toward said second inlet for closing said second inlet when positioned at said second inlet;

and means for coupling said closure members together and for moving said closure members in said first and second chambers, said closure members so shaped and positioned relative to each other that initially said first closure member closes said first inlet and said second closure member closes said second inlet and upon movement away from said first and second inlets said first closure member closes said bypass prior to said second inlet being opened.

7. A manifold for connecting a differential pressure meauring device to a fluid line into which an orifice is inserted for the measurement of differential pressures comprising:

a first chamber;

a second chamber disposed parallel to said first chamber;

a first inlet communicating with said first chamber at one end wall of said first chamber and adapted to be coupled to the high pressure side of said orifice;

a second inlet communicating with said second chamber at one end of said second chamber and adapted to be coupled to the low pressure side of said orifice;

a first outlet communicating with said first chamber at a point in the side wall of said first chamber intermediate the two end walls of said first chamber, said first outlet adapted to be coupled to the high pressure side of said differential pressure measuring device;

a second outlet communicating with said second chamber in the side wall of said second chamber at the second end of said second chamber, said second outlet adapted to be coupled to low pressure side of said differential pressure measuring device;

a bypass passage having two communicating sections, one of said sections communicating with said first chamber at the second end wall of said first chamber and axially aligned with said first chamber and the second of said two sections communicating with said second outlet and disposed transverse to said first chamber;

a first closure member movable longitudinally in said first chamber from said first inlet to said bypass and having a first valve head for closing said first inlet when said first closure member is positioned at said first inlet and a second valve head for closing said bypass when said first closure member is positioned at said second end wall of said first chamber;

a second closure member movable longitudinally in said second chamber from and toward said second inlet for closing said second inlet when positioned at said second inlet;

and means for coupling said closure members together and for moving said closure members in said first and second chambers, said closure members so shaped and positioned relative to each other that initially said first valve head closes said first inlet and said second closure member closes said second inlet and upon movement away from said first and second inlets said second valve head closes said bypass prior to said second inlet being opened.

8. A manifold for connecting a differential pressure measuring device to a fluid line into which an orifice is inserted for the measurement of differential pressures comprising:

first and second chambers;

a first inlet communicating with said first chamber and adapted to be coupled to a first side of said orifice;

a second inlet communicating with said second chamber and adapted to be coupled to a second side of said orifice;

a first outlet communicating with said first chamber and adapted to be coupled to a first input of said differential pressure measuring device;

a second outlet communicating with said second chamber and adapted to be coupled to a second input of said differential pressure measuring device;

a bypass having one end thereof communicating with said first chamber and a second end thereof communicating with said second outlet;

a first closure member movable in said first chamber from said first inlet to said bypass for closing said first inlet when positioned at said first inlet and for closing said bypass when positioned at said bypass;

a second closure member movable in said second chamber away from and toward said second inlet for closing said second inlet when positioned at said second inlet;

a yoke for coupling said closure members together;

and a rotatable handle engaging said yoke for moving said yoke and said closure members to initially close said inlets and to subsequently open said first inlet and close said bypass prior to opening said second inlet.

9. A manifold for connecting a differential pressure measuring device to a fluid line into which an orifice is inserted for the measurement of differential pressures comprising:

a first chamber;

a second chamber disposed parallel to said first chamber;

a first inlet communicating with said first chamber at one end of said first chamber and adapted to be coupled to a first side of said orifice;

a second inlet communicating with said second chamber at one end of said second chamber and adapted to be coupled to a second side of said orifice;

a first outlet communicating with said first chamber and adapted to be coupled to a first input of said differential pressure measuring device;

a second outlet communicating with said second chamber and adapted to be coupled to a second input of said differential pressure measuring device;

a bypass having one end thereof communicating with said first chamber at the second end of said first chamber and the second end of said bypass communicating with said second outlet;

a first closure member movable longitudinally in said first chamber from said first inlet to said bypass for closing said first inlet when positioned at said first inlet and for closing said bypass when positioned at said bypass;

a second closure member movable longitudinally in said second chamber away from and toward said second inlet for closing said second inlet when positioned at said second inlet;

a yoke for coupling said closure members together;

and means, including a rotatable handle engaging said yoke, for moving said yoke in a direction parallel to the longitudinal axes of said chambers and for moving said closure members in said chambers to initially close said inlets and to subsequently open said first inlet and close said bypass prior to opening said second inlet.

10. Apparatus for connecting a differential pressure measuring device to a fluid line comprising:

first and second tubular members each having two parallel sections connected together in fluid communication by a transverse section, one end of each of said tubular members so adapted to be coupled to said fluid line that when said tubular members are coupled to said fluid line said parallel sections of said first tubular member are parallel to said parallel sections of said second tubular member, said parallel sections so dimensioned that when said tubular members are coupled to said fluid line said transverse sections lie in two different parallel planes which are perpendicular to said parallel sections.

11. Apparatus for connecting a differential pressure measuring device to a fluid line comprising:

first and second tubular members each having two parallel sections connected together in fluid communication by a transverse section, one end of each of said tubular members adapted to be rotatably coupled into said fluid line, said parallel sections so dimensioned that when said tubular members are rotated in their couplings in said fluid lines and transverse sections lie in two different planes which are transverse to said parallel sections and said transverse sections do not interfere with one another.

12. Apparatus for connecting a differential pressure measuring device to a fluid line comprising:

a pair of similar tubular members each having two parallel sections connected together in fluid communication by a transverse section, said transverse sections being offset in a direction parallel to said parallel sections to permit interference-free rotation thereof about the axis of said parallel sections.

13. Apparatus for connecting a differential pressure measuring device to a fluid line comprising:

a pair of similar rigid tubular members each having first and second parallel sections connected together in fluid communication by a transverse section, the free end of the first section of the first member and the free end of the first section of the second member being parallel and adapted to be coupled to said fluid line and the free end of the second section of said first member and the free end of the second section of said second member being parallel and adapted to be coupled to said differential pressure measuring device, the transverse sections being offset so as to be in two different parallel planes to provide for rotation of said tubular members without interference.

14. Apparatus according to claim 13 wherein the transverse sections are disposed at right angles to the parallel sections which they interconnect.

15. Apparatus for connecting a differential pressure measuring device to a fluid line into which an orifice is inserted for the measurement of differential pressures comprising:

first and second chambers;

a first inlet communicating with said first chamber;

a second inlet communicating with said second chamber;

first and second tubular members each having two parallel sections connected together in fluid communication by a transverse section, one end of each of said tubular members so adapted to be coupled to said fluid line that when said tubular members are coupled to said fluid line said parallel sections of said first tubular member are parallel to said parallel sections of said second tubular member, the second end of said first tubular member coupled to said first inlet and the second end of said second tubular member coupled to said second inlet, said parallel sections so dimensioned that said transverse sections lie in two different parallel planes which are perpendicular to said parallel sections;

a first outlet communicating with said first chamber and adapted to be coupled to a first input of said differential pressure measuring device;

a second outlet communicating with said second chamber and adapted to be coupled to a second input of said differential pressure measuring device;

a bypass having one end thereof communicating with said first chamber and the second end thereof communicating with said second outlet;

a first closure member movable in said first chamber from said first inlet to said bypass for closing said first inlet when positioned at said first inlet and for closing said bypass when positioned at said bypass;

a second closure member movable in said second chamber away from and toward said second inlet for closing said second inlet when positioned at said second inlet;

and means for coupling said closure members together and for moving said closure members in said chambers to initially close said inlets and to subsequently open said first inlet and close said bypass prior to opening said second inlet.

16. Apparatus for connecting a differential pressure measuring device to a fluid line into which an orifice is inserted for the measurement of differential pressures comprising:

first and second chambers;
a first inlet communicating with said first chamber;
a second inlet communicating with said second chamber;
first and second similar tubular members each having two parallel sections of unequal lengths connected together in fluid communication by a transverse section, the free end of the shorter section of said first member adapted to be coupled to a first side of said orifice and the free end of the longer section of said second member adapted to be coupled to a second side of said orifice, the free end of the longer section of said first member coupled to said first inlet and the free end of the shorter section of the second member coupled to said second inlet;
a first outlet communicating with said first chamber and adapted to be coupled to a first input of said differential pressure measuring device;
a second outlet communicating with said second chamber and adapted to be coupled to a second input of said differential pressure measuring device;
a bypass having one end thereof communicating with said first chamber and the second end thereof communicating with said second outlet;
a first closure member movable in said first chamber from said first inlet to said bypass for closing said first inlet when positioned at said first inlet and for closing said bypass when positioned at said bypass;
a second closure member movable in said second chamber away from and toward said second inlet for closing said second inlet when positioned at said second inlet;
and means for coupling said closure members together and for moving said closure members in said chambers to initially close said inlets and to subsequently open said first inlet and close said bypass prior to opening said second inlet.

17. Apparatus for connecting a differential pressure measuring device to a fluid line into which an orifice is inserted for the measurement of differential pressures comprising:

first and second chambers;
a first inlet communicating with said first chamber;
a second inlet communicating with said second chamber;
first and second similar tubular members each having two parallel sections of unequal lengths connected together in fluid communication by a transverse section, the free end of the shorter section of said first member adapted to be coupled to a first side of said orifice and the free end of the longer section of said second member adapted to be coupled to a second side of said orifice, the free end of the longer section of said first member coupled to said first inlet and the free end of the shorter section of the second member coupled to said second inlet;
a first outlet communicating with said first chamber and adapted to be coupled to a first input of said differential pressure measuring device;
a second outlet communicating with said second chamber and adapted to be coupled to a second input of said differential pressure measuring device;
a bypass having one end thereof communicating with said first chamber and the second end thereof communicating with said second outlet;
a first closure member movable in said first chamber from said first inlet to said bypass for closing said first inlet when positioned at said first inlet and for closing said bypass when positioned at said bypass;
a second closure member movable in said second chamber away from and toward said second inlet for closing said second inlet when positioned at said second inlet;
and means for coupling said closure members together and for moving said closure members in said first and second chambers, and closure members so shaped and positioned relative to each other that initially said first closure member closes said first inlet and said second closure member closes said second inlet and upon movement away from said first and second inlets said first closure member closes said bypass prior to said second inlet being opened.

18. In a differential pressure measuring system wherein a manifold with valved connections is used to couple two fluid pressure conduits to respective inputs of a differential pressure measuring device: the improvement for effecting safe coupling of said device to said conduits through operation of a mannually-actuated external sequencing control, comprising:

first valve means operable by said control in an initial phase thereof to connect both of said inputs to one of said fluid pressure conduits so that both sides of said device receive the same fluid pressure;
second valve means operable by said control in an intermediate phase thereof to close off one of said device inputs from said one fluid pressure conduit while retaining said one device input sealed to hold in said one input the pressure condition initially placed therein by said one conduit; and
third valve means operable by said control in a final phase thereof to connect said one device input to the other of said fluid pressure conduits to pressurize said device in normal fashion with both fluid pressures, thereby to produce a measurement of the differential therebetween.

References Cited

UNITED STATES PATENTS

| 1,542,571 | 6/1925 | Mueller et al. | 137—630.17 |
| 2,558,534 | 6/1951 | Bentley | 73—407 XR |
| 2,807,281 | 9/1957 | Allen et al. | 137—609 XR |
| 3,028,963 | 4/1962 | Rose | 137—609 XR |
| 3,135,292 | 6/1964 | Roberts | 137—609 |
| 3,169,402 | 2/1965 | Baker | 73—407 |
| 3,304,779 | 2/1967 | Reed | 73—407 XR |
| 3,310,069 | 3/1967 | Hoffman | 137—609 XR |

SAMUEL SCOTT, *Primary Examiner.*

U.S. Cl. X.R.

137—609; 251—210